United States Patent [19]
Cai

[11] Patent Number: 5,271,038
[45] Date of Patent: Dec. 14, 1993

[54] DISTORTION SUPPRESSION USING THRESHOLDING TECHNIQUES

[75] Inventor: Khiem V. Cai, Brea, Calif.

[73] Assignee: Hughes Aircraft Company, Los Angeles, Calif.

[21] Appl. No.: 580,710

[22] Filed: Sep. 10, 1990

[51] Int. Cl.$^5$ ............................................... H04B 1/10
[52] U.S. Cl. .................................... 375/76; 307/555; 328/116; 375/102; 375/104
[58] Field of Search .................... 375/76, 99, 102, 104; 455/296, 308; 358/464, 465, 466; 364/576, 726; 328/115, 116, 163, 165; 307/350, 520, 555

[56] References Cited

U.S. PATENT DOCUMENTS

| | | | |
|---|---|---|---|
| 3,760,282 | 9/1973 | Arnold et al. | 328/116 |
| 3,963,983 | 6/1976 | Hogg | 328/116 |
| 4,458,206 | 7/1984 | Dellande et al. | 375/104 |
| 4,630,290 | 12/1986 | Kage | 375/104 |
| 4,815,108 | 3/1989 | Oda | 375/104 |
| 4,965,757 | 10/1990 | Grassart | 364/726 |
| 4,970,605 | 11/1990 | Fogaroli et al. | 358/464 |

*Primary Examiner*—Benedict V. Safourek
*Attorney, Agent, or Firm*—Wanda K. Denson-Low

[57] ABSTRACT

A distortion suppressor and method for suppressing distortion that performs processing in the time domain to suppress partial time distortion of received signals, and/or the frequency domain to suppress partial band distortion of the received signals. For time domain suppression, the received signals are sampled and sample amplitudes are sorted. Based on the sorted samples, the receiver searches for two levels, $S_L$ and $S_M$, representing clipping and removal thresholds. Any samples having amplitudes above $S_L$ are removed (zeroed), samples having amplitudes below $S_L$ are left alone, and samples having amplitudes between $S_L$ and $S_M$ are clipped to $S_L$. The processor searches for optimum $S_L$ and $S_M$ values to maximize the signal to noise ratio of the received signals. For frequency domain suppression, the received signals are processed by a Fourier transform (FFT) processor. The spectrum of output signals from the FFT processor is sampled in a manner similar to the time domain suppression. The sample amplitudes are sorted, and the clipping and removal thresholds, $S_L$ and $S_M$, are determined such that the output signal to noise ratio is maximized. Samples having amplitudes above $S_M$ are zeroed, and samples having amplitudes between $S_L$ and $S_M$ are clipped to $S_L$. The resulting signal has a maximum signal to noise ratio, that maximizes receiver performance. Clipping and removal thresholds $S_L$, $S_M$ are set with reference to the sorted amplitude profile, which determines two optimum clipping and removal threshold levels for the frequency distribution. Finally, the signals levels are clipped as stated above to maximize the suppression of interference and noise while achieving minimum distortion of the signals.

12 Claims, 3 Drawing Sheets

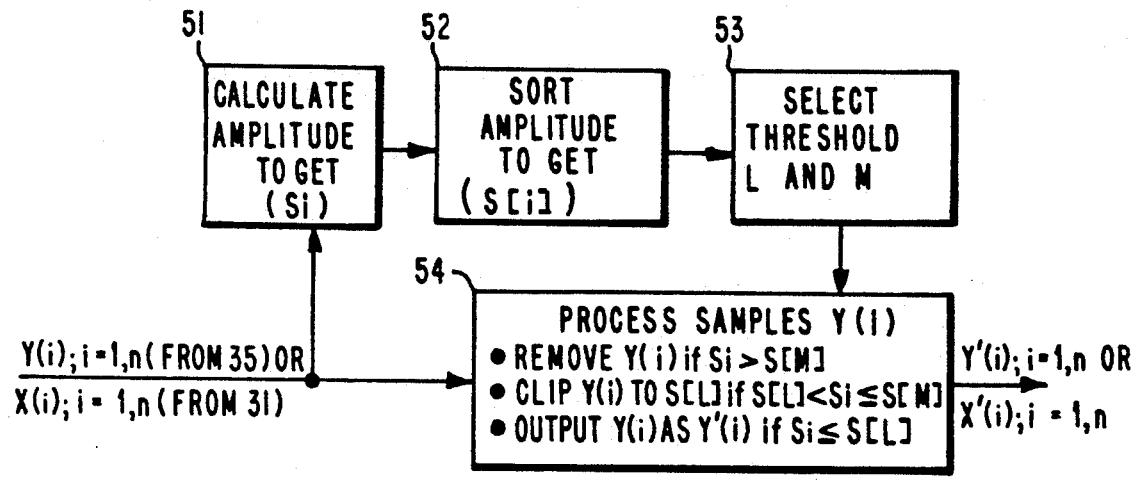
Fig. 3.
Fig. 4.
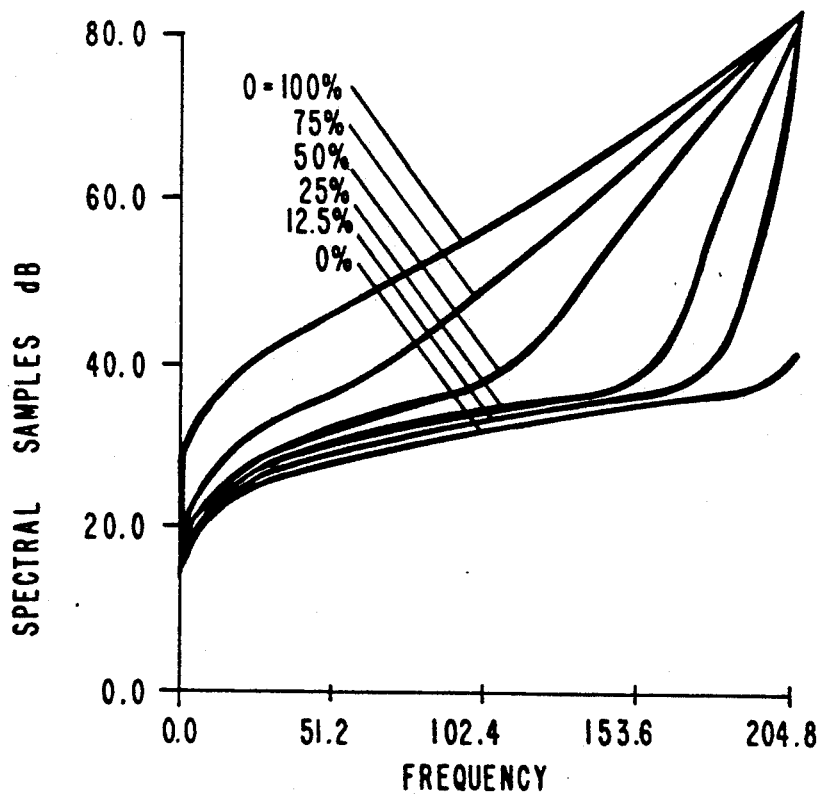

DISTORTION SUPPRESSION USING THRESHOLDING TECHNIQUES

BACKGROUND

The present invention relates generally to distortion suppression techniques, and more particularly, to a nonparametric distortion suppressing technique operable in the time and frequency domains that provide improved communication signal reception without knowledge of the distortion characteristics.

Prior art techniques that suppress interference include two major types: frequency domain and time domain. Existing frequency domain interference suppressors typically utilize adaptively controlled notch filters to suppress or excise narrow band interference. Practical versions of these filters have fairly wide notch widths, typically 2% to 10% of signal bandwidth, and require a significant adaptation time. Consequently, their preciseness of excision is severely limited, especially for multiple interference frequencies, and their long adaptation time makes the excision process vulnerable to swept or blinking jamming.

Existing time domain interference suppressors include receiver blankers, limiters and automatic gain control circuits. If the received interference power can exceed the damage threshold of the receiver front-end components, a protective blanker or limiter is needed to avoid damage. Also, a blanker or limiter may be needed in order to reduce or avoid receiver saturation recovery time. Prior art blanker and limiter circuits intended exclusively for these purposes are essentially transparent to antenna outputs below a critically high level.

Accordingly, it is an objective of the present invention to provide a distortion suppression technique that overcomes the limitations of conventional techniques and that is applicable to both time and frequency domain signal processing.

SUMMARY OF THE INVENTION

The present invention is a distortion suppressor and method for suppressing distortion that performs processing in the time domain to suppress partial time distortion of received signals, and/or the frequency domain to suppress partial band distortion of the received signals. These processing operations may be performed independently or in time sequence. The two operations are similar in that each operates on a set of time domain or frequency domain samples and each suppresses distortion without knowledge of the distortion characteristics.

Processing in the frequency domain using the principles of the present invention is as follows. Received signals comprising signals of interest, noise, and interference are received by the processor. The received signals are processed by a fast Fourier transform (FFT) processor. The spectrum of output signals from the FFT processor is sampled, and a curve representing the probability density of the FFT magnitudes versus amplitude is generated. This results in an amplitude-ordered set of FFT magnitudes of the received spectrum of signals. The amplitude-ordered set of FFT magnitudes is then sorted to generate a curve representing the spectral density versus ordered frequency of occurrence of the FFT magnitudes. The points on this curve represent the magnitudes, or spectral density distribution, of the amplitude-sorted FFT samples of the spectrum.

Then, a clipping threshold $S_L$ and a removal threshold $S_M$ are set with reference to the spectral density distribution, which in turn determines optimum clipping and removal threshold levels for the frequency distribution. Finally, a refined spectrum defined by the optimum clipping and removal threshold levels is generated by removing all received signals from the spectrum whose spectral density is above the optimum removal threshold level, and by clipping the signal level of all remaining signals whose spectral density is between the optimum clipping and removal threshold levels. Consequently, this series of operations maximizes the suppression of interference and noise while minimally distorting the processed signals.

In the time domain, the probability density of time domain sample amplitudes is sampled. Sorting each collected set of time domain samples into an order in which the sample amplitudes increase monotonically, as a function of a sorted reception time index, leads to an ordered sequence of time domain sample amplitudes. The removal and clipping thresholds on these amplitudes are selected and used to process the time domain samples in a manner described above with respect to the frequency domain processing.

Processing in accordance with the present invention applies universally to all signals having sufficient redundancy in time and/or frequency. This is a very wide class of signals, and includes virtually all spread signals, such as the direct sequence pseudo-random noise (DSPN) waveform, constant amplitude transform (CAT) waveform and other noise-like waveforms. It also includes signals having bandwidth-time products large enough to merit being called spread spectrum, including anti-jam, low probability of intercept, low probability of detection or covert signals. This class also includes all non-spread signals having sufficient redundancy to provide potential processing gains based on limiting or blanking reception in areas of the time-frequency plane that have unacceptably high distortion.

With specific regard to the processing of conventional spread spectrum signals, when such signals are received at low signal-to-noise ratios, unusually high amplitude time domain samples are attributed to impulsive noise or partial time interference, and unusually high amplitude frequency domain samples are attributed to non-flat (color) noise or partial band interference. Since these high amplitude samples are unlikely to make practical contributions to the recovery of the transmitted message, they are either clipped or removed using the processing in accordance with the present invention. The result is to suppress the effects of partial time and partial band interference, impulses and color noise from the reception process with no important loss of signal energy.

The distortion suppressor and method of the present invention improves upon and is adapted to replace the low power types of prior art frequency domain interference suppressors. The limitations of conventional frequency domain suppressors are completely overcome or reduced to insignificance by the frequency domain processor of the present invention. It also provides a performance improving supplement to or replacement for certain types of prior art time domain interference suppressors.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a block diagram illustrating the process flow in accordance with the principles of the present invention; and FIG. 4 shows the sorted spectrum applied to the threshold selection portion of FIG. 3.

DETAILED DESCRIPTION

Figure 1:
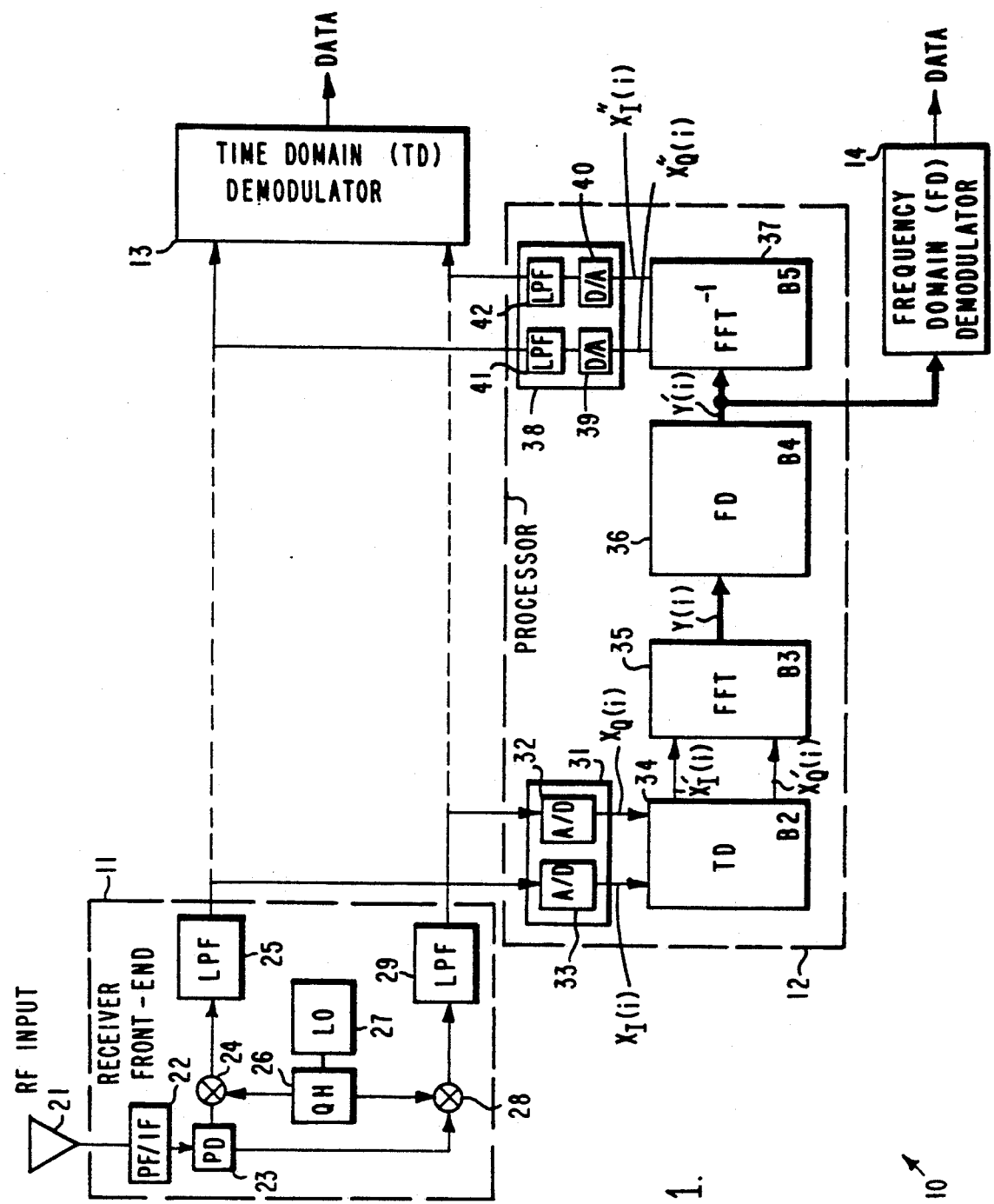
FIG. 1 is a block diagram illustrating a distortion processor in accordance with the principles of the present invention.

A block diagram illustrating a receiver 10 employing a distortion suppression processor 12 in accordance with the principles of the present invention is shown in FIG. 1. The receiver 10 typically comprises a receiver front-end 11, a distortion suppressor processor 12, a time domain demodulator 13, and a frequency domain demodulator 14. The receiver front-end 11 comprises an RF antenna 21, an RF to IF converter 22, a power divider 23, whose output is coupled to first and second mixers 24, 28, a local oscillator 27 coupled by way of a quadrature hybrid 26 to the first and second mixers 24, 28, and two low pass filters 25, 29 coupled from the outputs of the first and second mixers 24, 28 to the input of the time domain demodulator 13.

The distortion suppressor processor 12 comprises an input section 31 having two A/D converters 32, 33 adapted to process in-phase and quadrature (I & O) samples, a distortion suppressor time domain processor 34, an FFT processor 35 adapted to convert received signals from the time domain to the frequency domain, a distortion suppressor frequency domain processor 36, an inverse FFT processor 37 adapted to convert distortion-suppressed signals from the frequency domain to time domain, and an output section 38 comprising two D/A converters 39, 40 and two reconstruction low pass filters 41, 42 adapted to process-in-phase and quadrature (I & Q) samples. The outputs of the two reconstruction low pass filters 41, 42 are coupled to the time domain demodulator 13 in parallel with the outputs of the low pass filters 25, 29 of the receiver front-end 11. The output to the frequency domain demodulator 14 is provided by the distortion suppressor frequency domain processor 36.

The time domain demodulator 13 and the frequency domain demodulator 14 represent mutually exclusive alternatives dictated by the application and its interfaces. The time domain demodulator 13 and the frequency domain demodulator 14 contain or interface to the receiver elements required for time and frequency acquisition. The receiver front-end 11 and the appropriate choice of time domain demodulator 13 and frequency domain demodulator 14 are part of the interface environment for the distortion suppressor processor 12.

The time domain processor 34 and/or frequency domain processor 36 comprise the core of the distortion suppressor processor 12. The remaining portions of the distortion suppressor processor 12 are implemented to whatever extent is required to provide the necessary interface environment for the time and/or frequency domain processors 34, 36. For example, if the application requires all distortion suppressor processing and demodulation to be done in the frequency domain, it is only necessary to implement the receiver front-end 11 along with the A/D converters 32, 33, FFT processor 35 and distortion suppressor frequency domain processor 36. The corresponding exclusive use of time domain processing and demodulation requires only the receiver front-end 11 and the time domain demodulator 13 along with the A/D converters 32, 33, time domain processor 34, and the output section 38. Combined use of both time domain and frequency domain processing plus time domain demodulation requires the use of the receiver front-end 11, the time domain demodulator 13, and the entire distortion suppressor processor 12.

It should be clear from FIG. 1 that any subset of the functional elements that are selected to compose a specific distortion suppressor receiver 10 contains distortion suppressor processor 12, which in turn contain either a distortion suppressor time domain processor 34 or a distortion suppressor frequency domain processor 36 or both. Consequently, any distortion suppressor receiver 10 is inherently a processing receiver.

In operation, the receiver front-end 11 converts the received RF signal into baseband in-phase (I) and quadrature (Q) channels. The distortion suppressor processor 12 is insensitive to the specific design of the receiver front end 11. For example, interchanging the quadrature hybrid 26 and power divider 23 in the receiver front end 11 has no functional effect, although it may have a practical effect on the accuracy of 90 degree I to Q phase shift over the RF input band. In the distortion suppressor processor 12, the I and Q outputs of the receiver front end are sampled by the A/D converters 32, 33 and are converted to digital signals. The resulting digital samples of I and Q may be respectively represented as $X_I(i)$ and $X_Q(i)$; $i=1, n$, where n is the number of complex samples collected in each time domain sample set. Each complex sample is represented as $X(i)=X_I(i)+jX_Q(i)$; $i=1, n$.

The distortion suppressor time domain processor 34 is a necessary functional element of the distortion suppressor processor 12 if and only if suppression of partial time distortion is required. If so, it suppresses partial time distortion based on the input complex samples $X(i)$. This yields the distortion suppressor time domain processor output complex samples represented in as $X'(i)$; $i=1, n$. The distortion suppression processing is based exclusively on the digitized collected time domain samples $X(i)$. The FFT processor 35 converts the time domain processed samples $X'(i)$, or the unprocessed time domain samples $X(i)$ if the distortion suppressor time domain processor 34 is not used, into frequency domain samples. These FFT output samples are represented as $Y(i)$; $i=1, n$, and are the complex spectral samples of the received signal after partial time distortion suppression if the FFT input is $X'(i)$, or without partial time distortion suppression if the FFT input is $X(i)$.

The distortion suppressor frequency domain processor 36 is similar to the distortion suppressor time domain processor 34 except that it operates in the frequency domain. The distortion suppressor frequency domain processor 36 converts each set of spectral samples $Y(i)$ into a set of partial band distortion suppressed samples $Y'(i)$; $i=1, n$. This distortion suppression processing is based exclusively on the spectral samples $Y(i)$ output by the FFT processor 35. The inverse FFT processor 37 is necessary if, and only if, the time domain demodulator 13 is used. If so, the inverse FFT processor 37 performs the function of converting each complex spectral sample $Y'(i)$ into a distortion-suppressed regenerated time domain sample pair identified as $X''_I(i)$ and $X''_Q(i)$. The D/A converters 39, 40 and reconstruction low pass filters 41, 42 are necessary if, and only if, the time domain demodulator 13 is used. If so, they perform the inverse of the functions of the A/D converters 32, 33 of the input section 31 of the distortion suppressor processor 12.

The distortion suppressor time domain processor 34 samples the in-phase (I) and quadrature (Q) channel outputs of the receiver front-end 11, computes sample amplitudes, and sorts each collected set of them into monotonic increasing order. It then uses an application specific computational process to select the clipping and removal thresholds $s[\lambda]$ and $s[m]$, respectively, from the set of sorted sample amplitudes to use as follows. Samples of amplitude no greater than $s[\lambda]$ are not disturbed, sample amplitudes exceeding $s[\lambda]$ but no $s[m]$ are clipped to $s[\lambda]$, and samples of amplitude exceeding $s[m]$ are removed (zeroed). The result is that the output of the receiver 10 is either clipped or zeroed in the time intervals most corrupted by noise impulses or partial time interference. This, in effect, extracts for further processing the less corrupted signal components that are impossible or impractical to separate from the noise and interference by prior art means, thus allowing them to be demodulated with high fidelity.

The distortion suppressor frequency domain processor 36 sorts each set of FFT spectrum sample amplitudes into monotonic increasing order. The frequency domain processor 36 then uses an application specific computational process to select from each set of sorted spectrum sample amplitudes the clipping and removal thresholds $S[L]$ and $S[M]$, respectively, to use as follows. Samples of amplitude no greater than $S[L]$ are not disturbed, sample amplitudes exceeding $S[L]$ but not $S[M]$ are clipped to $S[L]$, and samples of amplitude exceeding $S[M]$ are removed. The surviving (possibly clipped) FFT samples are either given additional frequency domain processing or reconverted to the time domain for further time domain processing. Either way, the result is that the output of the receiver 10 is either limited or zeroed in the bands of the signal spectrum most corrupted by color noise or partial band interference. This extracts for further processing the less corrupted signal components that are impossible or impractical to separate from the noise and interference by prior art means and allows them to be demodulated with high fidelity.

The distortion suppressor processor 12 employs a technique that provides greatly improved reception of signals. The distortion suppressor processor 12 instantaneously and simultaneously suppresses both partial time and partial band interference. Examples of such interference include, but are not limited to, time domain noise impulses and bursts, and frequency domain interference ranging from discrete spectral line and subband interference caused by multiple independent interference sources, to arbitrary (non-flat or color) spectral noise.

The distortion suppressor processor 12 is not sensitive to received signal levels and requires no a priori knowledge of the existence or characteristics of any channel distortion caused by partial time and/or partial band interference. For example, the distortion suppressor processor 12 requires no inputs regarding the number of interference sources or the resulting interference amplitudes, timing, waveshapes or spectra. Also, the distortion suppressor is insensitive to time variations of the interference that are slow relative to the distortion suppressor reception sampling interval.

Consequently, because of its diverse capabilities, the distortion suppressor processor 12 offers new and improved interference suppression solutions to significant communications problems not solved by prior art techniques. These include, but are not limited to, problems caused by the following: high frequency color noise, impulsive noise, signal transmission environment contamination by dense populations of emitters, partial time and partial band jammers; and satellite communications uplink interference vulnerabilities. The interference suppression performed by the distortion suppressor processor 12 contributes significantly to the practical and robust realization of the potential time-frequency processing gain inherent in a wide range of transmitted waveform types.

The distortion suppressor processor 12 has the following advantageous characteristics. Practical implementations of the distortion suppressor processor 12 may be designed to suppress time domain and/or frequency domain channel distortion. The distortion suppressor processor 12 is nonparametric, in that it does not require a priori knowledge of the existence or characteristics of the channel distortion to be suppressed. The distortion suppressor time domain processor 34 automatically suppresses partial time interference and impulsive noise in real time on a self-contained basis, with no input of channel conditions or other "knowledge" of the existence or characteristics of the interference, noise or the resulting distortion. The time domain processor 34 suppresses the distortion caused by time domain interference that changes rapidly in duty factor, timing and power level. It provides improvement over a wide dynamic range of received RF signal levels, including those below the ambient noise level.

The distortion suppressor frequency domain processor 36 automatically suppresses partial band interference and color noise in real time on a self-contained basis, with no input of channel conditions or other "knowledge" of the existence or characteristics of the interference, noise or the resulting distortion. The frequency domain processor 36 does not divert any of its processing time or resources to locating interference frequencies or evaluating other interference parameters. It suppresses the distortion caused by a variety of noise spectra, including arbitrary color noise, and by numerous narrowband interference sources, even if each is changing rapidly in frequency and power level. Moreover, it can provide improvement over a wide dynamic range of received RF signal levels, including those below the ambient noise level.

The distortion suppressor processor 12 is universally applicable to all signals having sufficient redundancy in time and/or frequency, including spread-spectrum signals of significant verified practical value. Examples of these include the constant amplitude transform (CAT) and direct sequence pseudo-random noise (DSPN) waveforms based on minimum phase shift keying (MPSK) or minimum frequency shift keying (MSK). Adequate choices are available to help tailor the design of a specific implementation of the distortion suppressor to match the needs of practically any application. These design choices can provide a wide range of performance increments in exchange for progressive increases in sophistication. These choices also cover applications that require a menu of modes selected by initialization or by automatic adaptive means during operation.

Although the distortion suppressor processor 12 improves reception performance significantly in the presence of partial time and/or partial band distortion, it will not introduce degradation when there is an absence of distortion. This is because the distortion suppressor processor 12 automatically adapts to distortion conditions as they occur in real time on a self-contained basis, without dependence on external input of channel conditions.

The distortion suppressor processor 12 employs a nonparametric distortion suppression technique that operates in the time domain, the frequency domain, or both. The time domain and frequency domain processing operations of the distortion suppressor processor 12 correspond to each other to a very high degree. This correspondence is so high that one skilled in the art of reception subsystem design may develop the entire time domain portion of the distortion suppressor processor 12 merely on the basis of the frequency domain concepts described herein.

The concepts of ordered statistics and nonparametric distortion suppression in the frequency domain are illustrated in FIG. 2. FIG. 2a shows a typical plot of FFT processor 35 output amplitudes versus frequency representing the spectral density of a received signal corrupted by color noise and multiple partial band jammers. This spectrum is nonstationary and has a very ragged appearance. To characterize this spectrum, FIG. 2b shows the probability density function of the received spectral amplitudes output by the FFT processor 35. The unjammed signal plus noise samples generally have small amplitude, while the jammed samples typically have high amplitude. The amplitudes $S_i$ of the samples Y(i) can be ordered into the monotonic increasing sequence $S[1] \leq S[2] \leq S[3] \leq \ldots S[i] \ldots \leq S[n-2] \leq S[n-1] \leq S[n]$ —equation (1), where n is the number of FFT points corresponding to the signal bandwidth and the S[i] are the amplitude ordered amplitudes $S_i$ of the samples Y(i) at the output of the FFT, such that $S_i = |Y(i)|$ —equation (2); i=1, n, where i is the conventional index of sample frequencies, and $S[i] = |Y[i]|$ —equation (3); i=1, n, where i is the sorted frequency index (the index to the frequency) of amplitude-ordered samples Y[i].

Based on this concept, the frequency domain processor 36 calculates the amplitudes of the frequency domain samples output from the FFT processor 35. It then performs a sorting operation on these FFT output amplitudes to re-arrange them from their "natural frequency" order shown in FIG. 2a, into an order (not necessarily unique) in which the sample amplitudes increase monotonically as a function of the sorted frequency index i, shown by the curve in FIG. 2c. This results in an implicit definition of the sorted frequency index i as the abscissa of any sorted spectrum curve. Note that the left side of the sorted spectrum is small and flat, reflecting the smoothness of the noise, but the right side is high, reflecting intense interference. There may be a steep slope in the curve reflecting a transition from noise to interference. More generally, there may be a steep slope for each transition to a distinctly higher level of interference, as illustrated in FIG. 2b for Interference 1 and Interference 2 shown therein.

The frequency domain processor 36 selects a pair of sorted frequency samples to use as thresholds to partition each set of frequency domain samples into three subsets referred to as small amplitude samples, high amplitude samples and intermediate amplitude samples. The selected pair of samples to be used as thresholds are identified by their sorted frequency index values L and M, where $L \leq M$.

The frequency domain processor 36 partitions each set of frequency domain samples into the three subsets, and then selects and applies the appropriate processing to the samples in each subset. The frequency domain processor 36 defines and processes the subsets using an computational process summarized as follows:

Small amplitude spectral samples Y(i): $S_i \leq S[L]$. The small amplitudes correspond to signal plus noise samples not corrupted by strong jamming or interference. The frequency domain processor 36 does not alter these samples since that could degrade performance.

High amplitude spectral samples Y(i): $S_i > S[M]$. These samples are heavily corrupted by noise and interference, causing the signal components to be insignificantly small by comparison. The frequency domain processor 36 removes these samples by replacing them with zeros. This process removes both the signal and distortion components. However, since the distortion (noise plus interference) is much stronger than signal, the overall signal to distortion ratio is improved.

Intermediate amplitude spectral samples Y(i): $S[L] < S_i \leq S[M]$. These samples are corrupted only moderately by noise and interference. The frequency domain processor 36 clips (limits the magnitude of) these samples to the level S[L] to limit or suppress the contribution of the distortion components without completely losing the signal components.

Figure 2C:
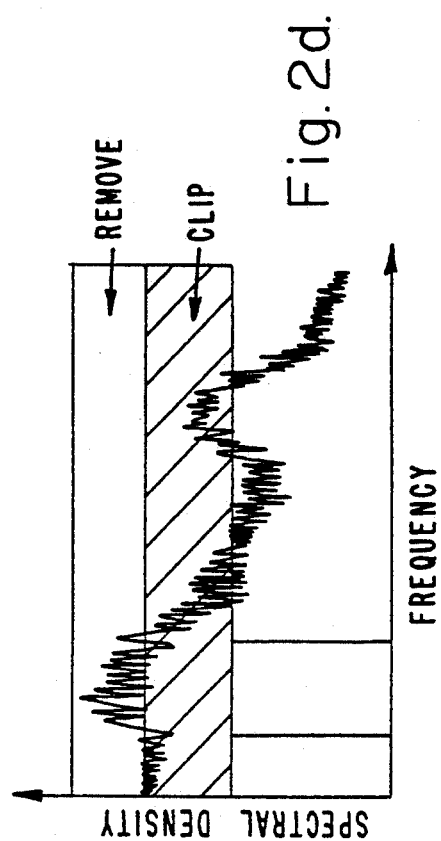
FIGS. 2a–2d show graphs illustrating signals at various stages of processing in accordance with the principles of the present invention.
Figure 2D:
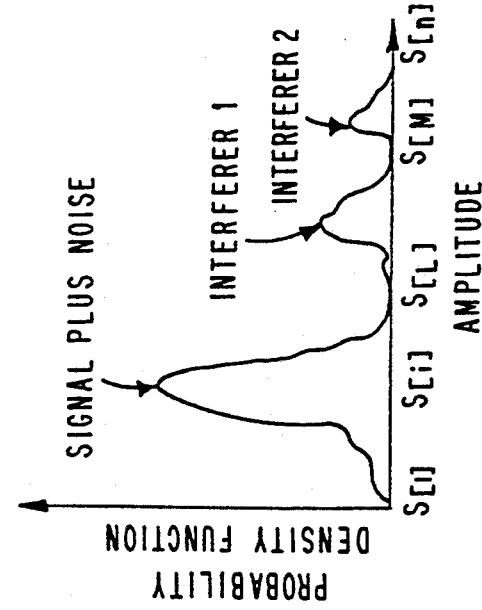
Figure 2A:
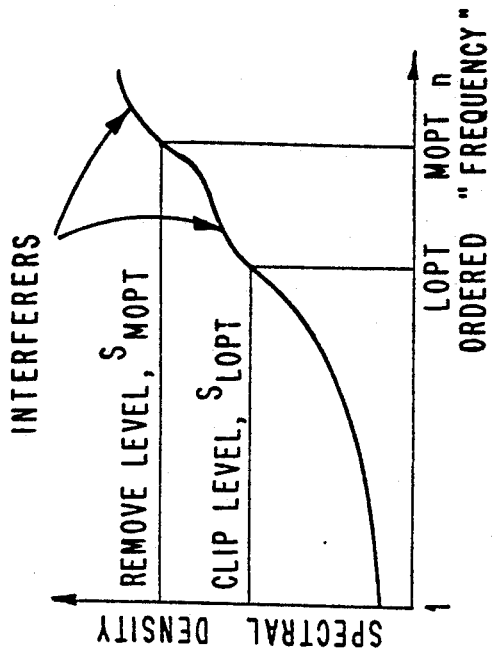
Figure 2B:
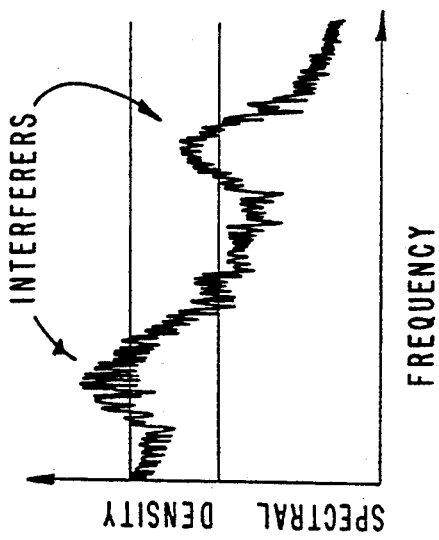

The key result of the clipping by the frequency domain processor 36 is to remove or suppress color noise and interference, as is illustrated in FIG. 2, which shows that the received spectrum represented by the Fourier transform shown in FIG. 2a is processed to remove or suppress color noise and interference to obtain the refined spectrum shown in FIG. 2d.

The four major processing functions of the frequency domain processor 36 as just described have been given abbreviated names, as is shown in FIG. 3 delineated within the four boxes as follows: calculate amplitudes of the received samples (box 51); sort the amplitudes of the received samples (box 52); select thresholds based on the amplitudes (box 53); and process the samples using the thresholds (box 54).

The overall relationships of these functions are illustrated in FIG. 3. FIG. 3 shows the top-level partitioning of processing performed within the distortion suppressor frequency domain processor 36 shown in FIG. 1. Within the frequency domain processing flow diagram of FIG. 3, the select thresholds function is subject to a variety of design options, including, but not limited to, the use of internal preselected fixed thresholds; the use of external input of thresholds that are fixed for each mission as an initialization input; or variable for each mission as an adaptive response to system inputs; or use internal adaptive thresholds.

The amplitude calculation (box 51) and amplitude sorting (box 52) portions of FIG. 3 are very simple to understand. In order to better understand the thresholding aspect of the present invention, reference is made to FIG. 4, which shows the sorted spectrum applied to the threshold selection box 53 of FIG. 3. The graphs illustrate several signal inputs that are a combination of Gaussian noise having a small signal of interest buried therein plus interference levels that are a stated percentage of the processed frequency band. The transition (knee) is located at the noise floor and corresponds to the percentage of the interference. The clipping threshold is selected to be at about this transitional level.

The signal to noise ratio after frequency domain processing is proportional to the symbol energy, E, and an improvement factor, $\Gamma$, that depends only on the frequency domain samples Y(i) appearing at the FFT output and on the selection of L and M. For convenience, $\Gamma$ can be expressed as $$\Gamma(SY(i),L,M) = \frac{\left[\frac{L}{n} + \frac{1}{2n} S[L]\{F(M) - F(L)\}\right]^2}{\frac{1}{n} G(L) + \frac{M-L}{n} S[L]^2}$$

where $F(k) = \sum_{i=1}^{k} S[i]^{-1}$ and $G(k) = \sum_{i=1}^{k} S[i]^2$.

The optimum suppression frequency domain processing computational process determines the parameter values $L_{opt}$ and $M_{opt}$. These are the values of L and M that maximize the improvement factor $\Gamma(\{SY(i)\}, L, M)$. Based on these values, the threshold levels $S[L_{opt}]$ and $S[M_{opt}]$ are determined and used for suppression. A more complete and exact definition of the optimum suppression computational process can be described as follows:

Box 35—Step 1: Perform n point FFT processing of the received waveform, and average the FFT outputs over p symbols, where p is a predetermined integer ≥ 1. Represent the result by the set of complex spectral samples $\{Y(i); i=1, n\}$, and for brevity denote this set by SY(i).

Box 51 and 52—Step 2: Perform sort to convert |Y[i]| to the sorted sequence S[i].

Box 53 - Step 3: Compute the array $F(k) = \sum_{i=1}^{k} S[i]^{-1}$ for $k = 1, n$.

Box 53 - Step 4: Compute the array $G(k) = \sum_{i=1}^{k} S[i]^2$ for $k = 1, n$.

Box 53—Step 5: Search for a pair of values of M and L that maximize $\Gamma(SY(i), L, M)$ of (17) over all positive integers $M \leq n$ and $L \leq M$ and store these values as $M_{opt}$ and $L_{opt}$.

Box 54—Step 6: Replace the samples Y(i) by Y'(i) defined, using abbreviations $S_i$ for |Y(i)| per (2) and S[i] for |Y[i]| per (3), in the simplified form $$Y'(i) = Y(i) \quad \text{for } S_i \leq \alpha S[L_{opt}]$$
$$= \frac{S[L]}{S_i} Y(i) \quad \text{for } \alpha S[L_{opt}] < S_i \leq \alpha S[M_{opt}]$$
$$= 0 \quad \text{for } S_i > \alpha S[M_{opt}]$$

where $\alpha(>1)$ is a safety factor used to prevent oversuppression due to inaccurate selection of $L_{opt}$ and $M_{opt}$ caused by fluctuation of the composite of signal plus noise and to assure that the phase between signal and noise amplitude is random within $[0, 2\pi]$.

The above 6-step computational process is employed the frequency domain processor shown in FIG. 3. After these processing steps, the output signal-to-noise ratio of the demodulator 14 of FIG. 1 is maximized, and the above computational process is optimum in this sense. Step 5 of this computational process requires at most $n(n+1)/2$ sub-steps of searching.

Example alternative computational process that may be implemented by the frequency domain processing functions depicted in FIG. 3 include the following: optimum suppression: thresholds $L=L_{opt}$, $M=M_{opt}$ (all frequency domain distortion suppressor steps) as described above; optimum removal: thresholds $L=M$, $M=M_{opt}$ (a subset of frequency domain distortion suppressor steps); optimum clipping: thresholds $L=L_{opt}$, $M=n$ (a subset of frequency domain distortion suppressor steps); median clipping: thresholds $L=n/2$, $M=n$ (n even) (a subset of frequency domain distortion suppressor steps); hard clipping: thresholds $L=1$, $M=n$ (yields a bandpass limiter) (non-distortion suppressor); and no suppression: thresholds $L=n$, $M=n$ (yields a linear receiver, with a non-distortion suppressor). The Appendix hereof provides definitive descriptions of the alternative special case frequency domain computational processes of the distortion suppressor 12.

The following is a description of the application of the present distortion suppression techniques applied to the time domain. The key to application of the distortion suppressing techniques to the time domain is the probability density of time domain sample amplitudes corresponding to FIG. 2b. In the time domain, the probability density of time domain sample amplitudes are sampled. Sorting each collected set of time domain samples into an order in which the sample amplitudes increase monotonically, as a function of a sorted reception time index, leads to an ordered sequence of time domain sample amplitudes corresponding to equation (1) and to FIG. 2c. The removal and clipping thresholds on these amplitudes are selected and used to processes the time domain samples in a manner described above with respect to the frequency domain processing.

Processing in accordance with the present invention applies universally to all signals having sufficient redundancy in time and/or frequency. This is a very wide class of signals, and includes virtually all spread signals, such as the direct sequence pseudo-random noise (DSPN) waveform, constant amplitude transform (CAT) waveform and other noise-like waveforms. It also includes signals having bandwidth-time products large enough to merit being called spread spectrum, including anti-jam, low probability of intercept, low probability of detection or covert signals. This class also includes all non-spread signals having sufficient redundancy to provide potential processing gains based on limiting or blanking reception in areas of the time-frequency plane that have unacceptably high distortion.

The distortion suppressor 12 provides a means for suppressing distortion that overcomes longstanding limitations of prior art approaches, designs and implementations for this purpose. In addition to its novelty and high performance capabilities, it is also inherently flexible. As a result, it can be advantageously applied in all types of reception subsystems for signals that incorporate a sufficient degree of redundancy in time and/or frequency. An important aspect of its high degree of flexibility is that the distortion suppressor 12 is not merely an isolated, singular technique for a narrow application, but instead, is a synergistic set of basic techniques that may be implemented separately or in cooperatively combined subsets referred to as ensembles. An additional aspect of its flexibility is that each ensemble can be embodied in a large variety of implementation forms. As another result of its high degree of flexibility, the distortion suppressor invention applies not only in the initial design of new reception subsystems, but also in the upgrading of existing subsystems via applique or retrofit approaches.

The distortion suppressor computational processing features operate only on the received signals, and do not require any external inputs regarding the characteristics of the noise or interference sources. For example, the optimum suppression capability of the distortion suppressor 12 can, without the aid of external inputs, suppress any combination of the following classes of noise and interference: (1) color (non-flat) noise (full band or partial band); (2) partial band interference (which in total may occupy most of the signal bandwidth), including (a) swept frequency jamming, (b) ragged spectrum jamming or interference (emissions from any source, such as RFI), (c) narrowband jamming or interference (emissions from any source), (d) CW (single-tone) jamming or interference (emissions from any source), and (e) comb (multi-tone CW) jamming or interference (emissions from any source); and (3) partial time interference (which in total may occupy most of each reception sampling interval), including (a) impulsive noise, (b) burst noise such as high frequency radio reception noise bursts, (c) on/off such as burst jamming or RFI from other users of the spectrum, (d) blinking interference due to jamming or highly congested RF spectrum utilization. Suppression of all these and other types of noise and interference is achieved by the distortion suppressor 12 without the use of adaptive narrowband notch filters or spectral whitening that would require a long processing time and could cause a significant performance degradation.

The distortion suppressor 12 time domain performance is ideal for constant amplitude signals, and its frequency domain performance is ideal for flat spectrum signals. The time domain sample-set power range (TSPR) and the frequency domain sample-set power range (FSPR) of distortion suppressor reception processing are simplified example measures of distortion suppressor applicability to a signal waveform (ideal or non-ideal) that are similar to the reception dynamic range parameter of a conventional non-processing receiver.

Thus there has been described a new and improved system and method of suppressing distortion. It is to be understood that the above-described embodiments are merely illustrative of some of the many specific embodiments that represent applications of the principles of the present invention. Clearly, numerous and varied other arrangements can be readily devised by those skilled in the art without departing from the scope of the invention.

APPENDIX

Sub-Optimum Suppression Algorithms (Special Cases).

Linear Receiver. This classical receiver does not perform any distortion suppression processing. However, this restriction does not prevent it from containing a demodulator for spread signals, in which case it would be a processsing receiver. In fact, due to the restrictive focus on the CAT and DSPN spread spectrum waveforms to illustrate the merits of the present invention, the linear receiver of the appropriate processing type for each of these waveforms is used as the standard basis of comparison for all numerical evaluations of performance. Therefore, the so-called linear receiver is actually a class of receivers. This class is included as an example special case here because it is a well known standard conventional prior art technique useful as a reference basis for comparative evaluations of more modern techniques. It is equivalent to setting $L=M=n$ in the frequency domain processing scheme. As the standard of comparison, the linear receiver by definition does not improve reception performance for interference or color noise, nor does it cause any degradation for AWGN.

Hard Clipping (spectral type). This algorithm clips (limits) all spectral samples so as not to exceed a predetermined fixed maximum amplitude. It is equivalent to setting $L=1$ and $M=n$, and does not require a searching algorithm. Its loss is 1.05 dB for AWGN and 6 dB for full band constant amplitude interference. However, this primitive processor performs quite well under some conditions including AWGN plus small fractional band interference. Hard clipping is another conventional reference algorithm, and is called a bandpass limiter in the technical literature.

Median Clipping (spectral type). This algorithm clips (limits) all spectral sample amplitudes so that none of them exceed the median of the amplitudes in the collected FFT spectrum sample set SY(i) defined in Step 1 above. This is equivalent to setting $L=n/2$ (for n even) and $M=n$. Computing $L=n/2$ requires a sorting algorithm. Median clipping has a loss of about 0.5 dB for AWGN and 2.5 dB for full band constant amplitude interference. It performs quite well for partial band interference fractions up to 50%, but has lower performance for higher fractions. It does not require a searching process and therefore is not complex or slow.

Optimum Clipping (spectral type). This algorithm clips (limits) all spectral sample amplitudes so that none of them exceed the optimum limiting threshold. This amounts to setting $L=L_{opt}$ and $M=n$. Computing $L_{opt}$ requires a sorting algorithm followed by a searh over n cases. Optimum clipping has loss of about 0.5 dB for AWGN and 2.5 dB for full band constant amplitude interference. It performs very well for partial band interference fractions at least up to 50%.

Optimum Removal (spectral type). This algorithm removes all spectral samples having amplitudes that exceed the optimum removal threshold. This amounts to setting $L=M=M_{opt}$. Computing $M_{opt}$ requires a sorting algorithm followed by a search over n cases. The performance of optimum removal has been evaluated by extensive simulation and found to be identical to that of optimum suppression in every example tested. These results suggest that optimum removal might prove to be practically optimum for nearly all applications. The algorithm removes all samples having amplitude exceeding the threshold level $\alpha S[M_{opt}]$.

Processing time is greatly reduced by setting a single threshold ($1=M$) which results in G defaulting to the following equation:

$$\Gamma(SY(i), M, M) = \frac{M^2}{n\, G(M)}.$$

What is claimed is:

1. A distortion suppressor for use with a receiver that is adapted to process time domain or frequency domain signals and remove interference therefrom, said suppressor comprising:

means for processing signals comprising noise and interference to provide an amplitude-sorted set of signals sorted in accordance with a predefined criterion;

means for selecting the thresholds for the amplitude-sorted set of signals using predefined clipping and removal thresholds; and means for processing the amplitude-sorted set of signals by removing all received signals whose amplitude is above the predefined removal threshold and by clipping the signal amplitude of all remaining signals whose amplitudes are between the predefined clipping and predefined removal thresholds to maximize the signal to noise ratio of output signals provided thereby;

whereby interference and noise contained in the processed signals is suppressed and distortion of the signals is minimized.

2. The distortion suppressor of claim 1 wherein the amplitude-sorted set of signals is sorted on the amplitude of the time domain signals.

3. The distortion suppressor of claim 1 wherein the amplitude-sorted set of signals is sorted on the amplitude of the frequency domain signals.

4. A time domain distortion suppressor for use with a receiver that is adapted to process time domain signals and remove interference therefrom, said suppressor comprising;

means for processing a spectrum of signals comprising noise and interference to provide an amplitude-sorted set of signals sorted in accordance with the amplitude of the time domain signals;

means for selecting the thresholds for the amplitude-sorted set of signals using predefined clipping and removal thresholds; and means for processing the amplitude-sorted set of signals by removing all received signals from the spectrum whose amplitude is above the predefined removal threshold and by clipping the signal amplitude of all remaining signals whose amplitudes are between the predefined clipping and predefined removal thresholds to maximize the signal to noise ratio of output signals provided thereby;

whereby interference and noise contained in the processed signals is suppressed and distortion of the signals is minimized.

5. A time domain distortion suppressor for use with a receiver that is adapted to process frequency domain signals and remove interference therefrom, said suppressor comprising:

means for processing a spectrum of signals comprising noise and interference to provide an amplitude-sorted set of signals sorted in accordance with the amplitude of the frequency domain signals;

means for selecting the thresholds for the amplitude-sorted set of signals using predefined clipping and removal thresholds; and means for processing the amplitude-sorted set of signals by removing all received signals from the spectrum whose amplitude is above the predefined removal threshold and by clipping the signal amplitude of all remaining signals whose amplitudes are between the predefined clipping and predefined removal thresholds to maximize the signal to noise ratio of output signals provided thereby;

whereby interference and noise contained in the processed signals is suppressed and distortion of the signals is minimized.

6. The time distortion suppressor of claim 4 which is further adapted to process frequency domain signals to remove interference therefrom, and which further comprises:

a Fourier transform processor coupled to the time distortion processor for processing the output signals provided thereby to provided Fourier transformed output signals; and a frequency domain distortion suppressor coupled to receive the fast Fourier transformed output signals that comprises:

means for processing a spectrum of signals comprising noise and interference to provide an amplitude-sorted set of signals in accordance with the amplitude of the frequency domain signals;

means for selecting the thresholds for the amplitude-sorted set of signals using predefined clipping and removal thresholds; and means for processing the amplitude-sorted set of signals by removing all received signals from the spectrum whose amplitude is above the predefined removal threshold and by clipping the signal amplitude of all remaining signals whose amplitudes are between the predefined clipping and predefined removal thresholds to maximize the signal to noise ratio of output signals provided thereby;

whereby interference and noise contained in the processed signals is suppressed and distortion of the signals is minimized.

7. A method of suppressing distortion in received signals, said received signals including noise and interference, comprising the steps of:

calculating amplitudes of the received signal;

amplitude sorting the received signals in terms of a predefined criterion;

selecting the thresholds for the amplitude-sorted signals using predefined clipping and removal thresholds;

removing those sorted signals whose magnitudes are above the predefined removal threshold value;

clipping those remaining sorted signals whose magnitudes are above the predefined clipping threshold value and below the predefined removal threshold value to provide output signals having minimum distortion.

8. The method of claim 7 wherein the step of amplitude sorting the received signals comprises amplitude-sorting received time domain signals.

9. The method of claim 7 wherein the step of amplitude sorting the received signals comprises amplitude sorting received frequency domain signals.

10. A method or suppressing distortion in received signals comprising the steps of:

amplitude sorting the received signals using time domain samples;

removing those sorted time domain samples whose magnitudes are above a first predetermined threshold value;

clipping those remaining sorted time domain samples whose magnitudes are above a second predetermined threshold value and below the first predetermined threshold value to provide first output signals having minimum distortion;

Fourier transforming the first output signals;

amplitude sorting the Fourier transformed first output signals using frequency domain samples;

removing those sorted frequency domain samples whose magnitudes are above a third predetermined value; and clipping those remaining sorted frequency domain samples whose magnitudes are above a fourth predetermined threshold value and below the third predetermined threshold value to provide second output signals having minimum distortion.

11. A method of suppressing distortion in received signals comprising interference and noise, said method comprising the steps of:

receiving signals comprising a desired signal, noise, and interference signals;

in the frequency domain, processing the received signals by a Fourier transform processor;

sampling the spectrum of output signals from the Fourier transform processor;

generating a curve representing the probability density of the Fourier transform magnitudes versus amplitude of the sampled signals to generate an amplitude-ordered set of Fourier transform magnitudes of the received spectrum of signals;

sorting the amplitude-ordered set of Fourier transform magnitudes to generate a curve representing the spectral density versus ordered frequency of occurrence of the magnitudes, and wherein the points on this curve represent the magnitudes, or spectral density distribution, of the amplitude-sorted Fourier transform of the received signal spectrum;

defining a clipping threshold and a removal threshold with reference to the spectral density distribution, which in turn determines two optimum clipping and removal threshold levels for the frequency distribution; and generating a refined spectrum defined by the optimum clipping and removal threshold levels is generated by removing all received signals from the spectrum whose spectral density is above the optimum removal threshold level and by clipping the signal level of all remaining signals whose spectral density is between the optimum clipping and removal threshold levels to provide output signals having minimum distortion;

whereby interference and noise contained in the processed signals is suppressed and distortion of the signals is minimized.

12. A method of suppressing distortion in received signals comprising interference and noise, said method comprising the steps of:

receiving signals comprising a desired signal, noise, and interference signals;

in the time domain, sampling the received signals;

sorting the sampled signals to produce an amplitude-ordered set of signals as a function of time to generate a spectrum of the amplitude-sorted sampled signals;

defining a clipping threshold and a removal threshold with reference to the spectral density distribution, which in turn determines two optimum clipping and removal threshold levels for the frequency distribution; and generating a refined spectrum defined by the optimum clipping and removal threshold levels by removing all received signals from the spectrum whose spectral density is above the optimum removal threshold level and by clipping the signal level of all remaining signals whose spectral density is between the optimum clipping and removal threshold levels;

whereby interference and noise contained in the received signals is suppressed and distortion of the signals is minimized.

* * * * *